ISAAC KAYLAR.
Improvement in Soldering Apparatus.
No. 115,617. Patented June 6, 1871.
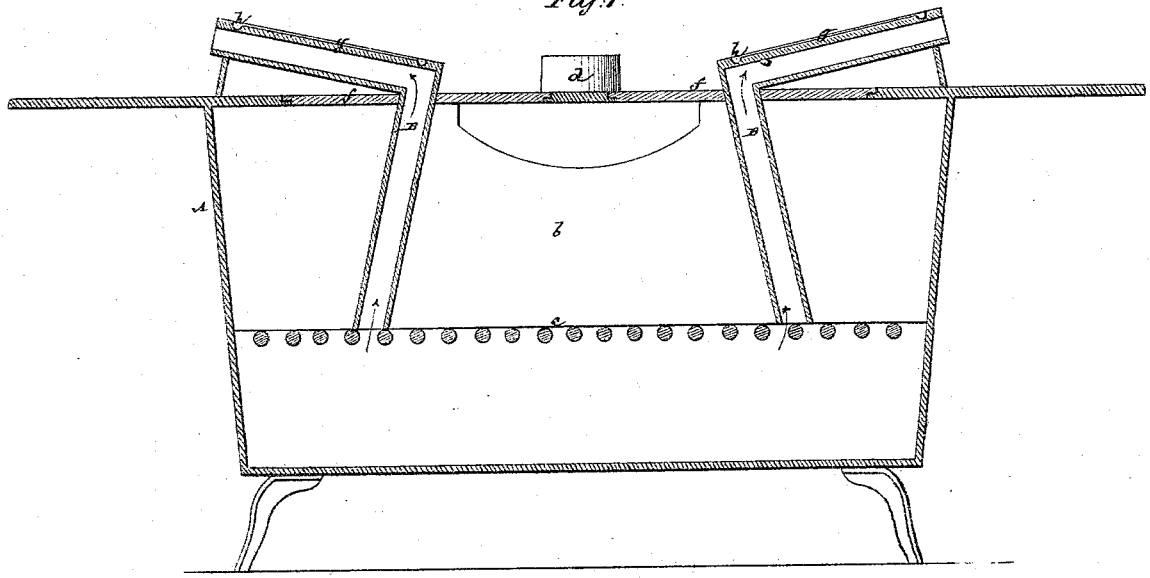
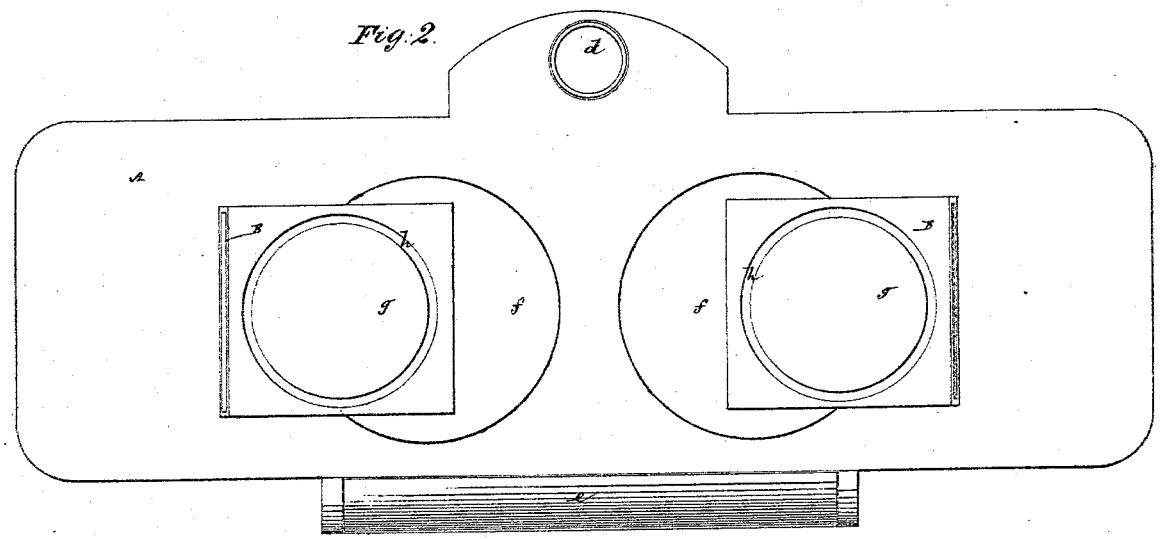
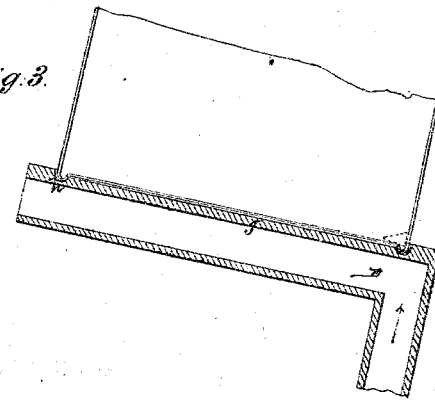
Witnesses:
Isaac Kaylar

UNITED STATES PATENT OFFICE.

ISAAC KAYLAR, OF JERSEY CITY, NEW JERSEY.

IMPROVEMENT IN SOLDERING APPARATUS.

Specification forming part of Letters Patent No. 115,617, dated June 6, 1871.

*To all whom it may concern:*

Be it known that I, ISAAC KAYLAR, of Jersey City, in the county of Hudson and State of New Jersey, have invented a new and useful Improvement in Soldering Apparatus, of which the following is a full, clear, and exact description, reference being had to the accompanying drawing forming part of this specification, in which—

Figure 1 represents a vertical section of a soldering furnace or apparatus constructed in accordance with my invention; Fig. 2, a plan of the same; and Fig. 3, a vertical section, on a larger scale, of a portion of said apparatus, with a metal can—shown only in part—as arranged thereon, and under the operation of being soldered.

Similar letters of reference indicate corresponding parts throughout the several figures.

My invention, which is mainly designed for soldering the ends on sheet-metal cans used in putting up fruits, meats, and other perishable articles, consists in a soldering-furnace, provided with a hot-air flue or flues, constructed to form an inclined soldering bed or beds, whereby the process of soldering the tops and bottoms of said cans may be carried on without interruption during and immediately after the introduction of a new charge of fuel, and less solder suffices to make good the joint; also "drop-solder," which is cheaper, may be used in the place of "ring-solder."

Referring to the accompanying drawing, A represents the furnace, which, in general construction, may be similar to other soldering-furnaces, *b* being the fire-chamber, *c* the grate, *d* the smoke-flue, *e* the door for feeding in the fuel, and *f f* the top lids or covers of the furnace. B B are angular hot-air flues, preferably of a flattened construction, and arranged to dip down into or through the fire-chamber to or below the grate *c*, and to project through the top of the furnace or its covers *f* in oblique directions, so as to form heated plate-surfaces *g*, inclining upwardly from their junction with the legs of the flues. An annular groove, *h*, may be formed in each inclined heated plate or surface *g*, to receive the edges of the top or bottom of the can when the latter is put in position to be soldered, as represented in Fig. 3. The edges of said grooves also serve as guides to direct the can when being turned to effect the soldering of them, as hereinafter described.

By passing the legs of the flues B through the fire in the furnace the same become highly heated, so that there need be no interruption to the soldering process during or immediately after the introduction of a new charge of fuel, as is ordinarily necessary in other soldering-furnaces, owing to the cooling down of the top or covers of the furnace. The plates or surfaces *g* are accordingly kept constantly heated to a temperature sufficient to melt the solder; and the greatest heat is concentrated where it is most required, namely, at the junction of the upper inclined portions of the flues with the legs thereof. The soldering of the top and bottom of the can is effected by placing the can on either heated plate or soldering-bed *g* with a small lump of drop-solder inserted in the can, as represented in Fig. 3, when the solder will adjust itself, and be caused to melt immediately over the lowest point of the grooved end of the can, so that by turning the latter once, twice, or more frequently, if necessary, around on the plate *g*, the solder will flow or be distributed all around the joint of the can and the same thus be made tight. The general heated surface of the plate *g* prepares or warms the ends of the can before or as its edge approaches the hottest point in the plate over which the solder lies, thus expediting the soldering of the joint; and to further expedite the process the cans to be soldered may be preliminarily heated by arranging them on a heated shelf connected with the furnace.

The process as thus carried out not only enables me to economize in the quantity of solder necessary to make a tight joint, but by it I am enabled to use drop-solder in the place of ring-solder arranged around the groove in the can end, made out of wire, at greater expense, and attendant with much trouble, labor, and uncertainty as regards the placing of said ring at the joint. Thus I am enabled to make the cans not only more expeditiously but cheaper and more perfectly.

In some cases it may be desirable to close the outer end of either flue, B, or to provide it with a damper to regulate the opening or closing of it; likewise said flue, instead of being extended down to the grate, may only dip into the fire-chamber or be open to it above the grate, or be led through the side of the furnace, if desired.

What is here claimed, and desired to be secured by Letters Patent, is—

1. The combination, with the furnace, of one or more angular hot-air flues, B, constructed to form inclined soldering-beds $g$, and made to dip down into or through the fire-chamber, substantially as specified.

2. The angular hot-air flue or flues B, constructed with an annular groove, $h$, on their upper inclined surfaces $g$, and arranged, in relation to the grate of the furnace and its top or lid, essentially as shown and described.

ISAAC KAYLAR.

Witnesses:
   FRED. HAYNES,
   R. E. RABEAU.